United States Patent
Verma et al.

(10) Patent No.: US 12,532,183 B2
(45) Date of Patent: Jan. 20, 2026

(54) APPLYING SUBSCRIBER-ID BASED SECURITY, EQUIPMENT-ID BASED SECURITY, AND/OR NETWORK SLICE-ID BASED SECURITY WITH USER-ID AND SYSLOG MESSAGES IN MOBILE NETWORKS

(71) Applicant: Palo Alto Networks, Inc., Santa Clara, CA (US)

(72) Inventors: Sachin Verma, Danville, CA (US); Leonid Burakovsky, Pleasanton, CA (US); Hugo Alberto Perez Villegas, Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 505 days.

(21) Appl. No.: 17/900,706

(22) Filed: Aug. 31, 2022

(65) Prior Publication Data
US 2024/0073698 A1    Feb. 29, 2024

(51) Int. Cl.
*H04W 12/72*    (2021.01)
*H04W 12/08*    (2021.01)
*H04W 12/37*    (2021.01)
*H04W 12/71*    (2021.01)

(52) U.S. Cl.
CPC .......... *H04W 12/72* (2021.01); *H04W 12/08* (2013.01); *H04W 12/37* (2021.01); *H04W 12/71* (2021.01)

(58) Field of Classification Search
CPC ..... H04W 12/72; H04W 12/08; H04W 12/37; H04W 12/71
See application file for complete search history.

(56) References Cited

U.S. PATENT DOCUMENTS 10,051,001 B1 *   8/2018  Ashley ................. H04L 63/083
10,531,305 B1 *   1/2020  Verma .................. H04W 12/08
(Continued)

FOREIGN PATENT DOCUMENTS

WO   2020198157   10/2020

OTHER PUBLICATIONS

Owuor "Towards Simple, Efficient and Centralized Log Monitoring, and Analysis of 5G Core Cloud Native Network Functions"—Presented Aug. 30, 2022 (Year: 2022).*

(Continued)

*Primary Examiner* — Jinsong Hu
*Assistant Examiner* — Justin Barry
(74) *Attorney, Agent, or Firm* — Van Pelt, Yi & James LLP

(57) ABSTRACT

Techniques for applying subscriber-ID based security, equipment-ID based security, and/or network slice-ID based security with user-ID and syslog messages in mobile networks are disclosed. In some embodiments, a system/process/computer program product for applying subscriber-ID based security, equipment-ID based security, and/or network slice-ID based security with user-ID and syslog messages in mobile networks includes monitoring network traffic on a mobile network at a security platform to identify a new session; extracting a plurality of parameters by parsing syslog messages with a user-ID agent at the security platform; and enforcing a security policy on the new session at the security platform based on one or more of the plurality of parameters including one or more of a subscriber-ID, equipment-ID, and network slice-ID to apply context-based security in the mobile network.

17 Claims, 12 Drawing Sheets

(56) References Cited

U.S. PATENT DOCUMENTS

| | | | | |
|---|---|---|---|---|
| 10,574,670 | B1* | 2/2020 | Verma | H04W 12/72 |
| 11,019,077 | B2* | 5/2021 | Verma | H04L 63/205 |
| 2018/0367571 | A1* | 12/2018 | Verma | H04L 63/0263 |
| 2020/0213897 | A1* | 7/2020 | Qiao | H04L 47/765 |
| 2021/0099487 | A1 | 4/2021 | Verma | |
| 2021/0409375 | A1 | 12/2021 | Burakovsky | |
| 2022/0070223 | A1* | 3/2022 | Deng | G06F 21/566 |
| 2022/0078696 | A1* | 3/2022 | Saxena | H04W 8/08 |
| 2022/0311744 | A1* | 9/2022 | Shevade | G06F 9/45558 |
| 2022/0337706 | A1* | 10/2022 | Kotecha | H04M 15/8016 |
| 2024/0397322 | A1* | 11/2024 | Baskaran | H04W 12/35 |

OTHER PUBLICATIONS

Loggly, "Automated parsing of log types HTTP and SYSLOG" (Year: 2020).*

3GPP, 3GPP TS 23.501 V17.5.0 (Jun. 2022), Technical Specification, 3rd Generation Partnership Project; Technical Specification Group Services and System Aspects; System architecture for the 5G System (5GS); Stage 2 (Release 17), pp. 1-568.

3GPP, 3GPP TS 23.003 V16.9.0 (Mar. 2022), Technical Specification, 3rd Generation Partnership Project; Technical Specification Group Core Network and Terminals; Numbering, addressing and identification; (Release 16), pp. 1-143.

Covaci et al., Towards Autonomous Security Assurance in 5G Infrastructures, Sep. 20, 2018, pp. 1-9.

Gai et al., Intrusion Detection Techniques for Mobile Cloud Computing in Heterogeneous 5G, Research Article, Security and Communication Networks, Security Comm. Networks 2016, 9:3049-3058, Feb. 11, 2015.

Horn et al., Towards 5G Security, IEEE, 2015 IEEE Presented at the 14th IEEE International Conference on Trust, Security, and Privacy in Computing and Communications, Aug. 20-22, 2015.

Liyanage et al., Software Defined Security Monitoring in 5G Networks, Chapter 10, Jan. 2018, pp. 231-243.

* cited by examiner

| PA-5280 | DASHBOARD | ACC | MONITOR | POLICIES | OBJECTS | NETWORK | DEVICE | | | | |
|---|---|---|---|---|---|---|---|---|---|---|---|
| Virtual System | vsys1 | | | | | | | | | | |

| | | | | Source | | | | Destination | | | | | | | |
|---|---|---|---|---|---|---|---|---|---|---|---|---|---|---|---|
| | NAME | ZONE | ADDRESS | USER | SUBSCRIBER | EQUIPMENT | ZONE | ADDRESS | APPLICATION | SERVICE | ACTION | PROFILE | OPTI... | HIT COUNT |
| Security | | | | | | | | | | | | | | |
| NAT | | | | | | | | | | | | | | |
| QoS | | | | | | | | | | | | | | |
| Policy Based F | 7 | UserID any Policy | any | 0020029997149 | any | any | any | any | any | any | 𝄢 applic... | ⊘ Allow | ⊙ | ▣ | 24270 |
| Decryption | | | | | | | | | | | | | | |
| Network Packa | | | | | | | | | | | | | | |

| PA-VM | DASHBOARD | ACC | MONITOR | POLICIES | OBJECTS | NETWORK | DEVICE | | Commit ⌄ | | |
|---|---|---|---|---|---|---|---|---|---|---|---|

Security

→ NAT
QoS
Policy Based Forwarding
Decryption
Tunnel Inspection

| | | | Source | | | | Destination | | | | |
|---|---|---|---|---|---|---|---|---|---|---|---|
| | NAME | TYPE | ZONE | ADDRESS | USER | SUBSCRIBER | ZONE | ADDRESS | APPLICATION | ACTION | PROFILE |
| 1 | IMEI as User-ID | universal | any | any | 352620112083634 | any | any | any | any | ⊘Allow | |

FIG. 2C

| | | Source | | | Destination | | | | |
|---|---|---|---|---|---|---|---|---|---|
| NAME | ZONE | ADDRESS | USER | ZONE | ADDRESS | APPLICATION | SERVICE | PROFILE |
| 1 | Network Slice -ID Policy | any | any | 1:1000 | any | any | any | ⚙ application... | 🔷🔷🔷🔷 |

APPLYING SUBSCRIBER-ID BASED SECURITY, EQUIPMENT-ID BASED SECURITY, AND/OR NETWORK SLICE-ID BASED SECURITY WITH USER-ID AND SYSLOG MESSAGES IN MOBILE NETWORKS

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 2A is an example screen diagram for an interface of a security platform at the SGi interface in L3 mode receiving syslog messages from the PGW in a 4G/LTE network in accordance with some embodiments.

FIG. 2B is an example screen diagram for an interface of a security platform at the N6 interface in L3 mode receiving syslog messages from the UPF in a 5G network in accordance with some embodiments.

FIG. 2C is another example screen diagram for an interface of a security platform at the SGi interface in L3 mode receiving syslog messages from the PGW in a 4G/LTE network in accordance with some embodiments.

FIG. 2D is another example screen diagram for an interface of a security platform at the N6 interface in L3 mode receiving syslog messages from the UPF in a 5G network in accordance with some embodiments.

DETAILED DESCRIPTION

Figure 1A:
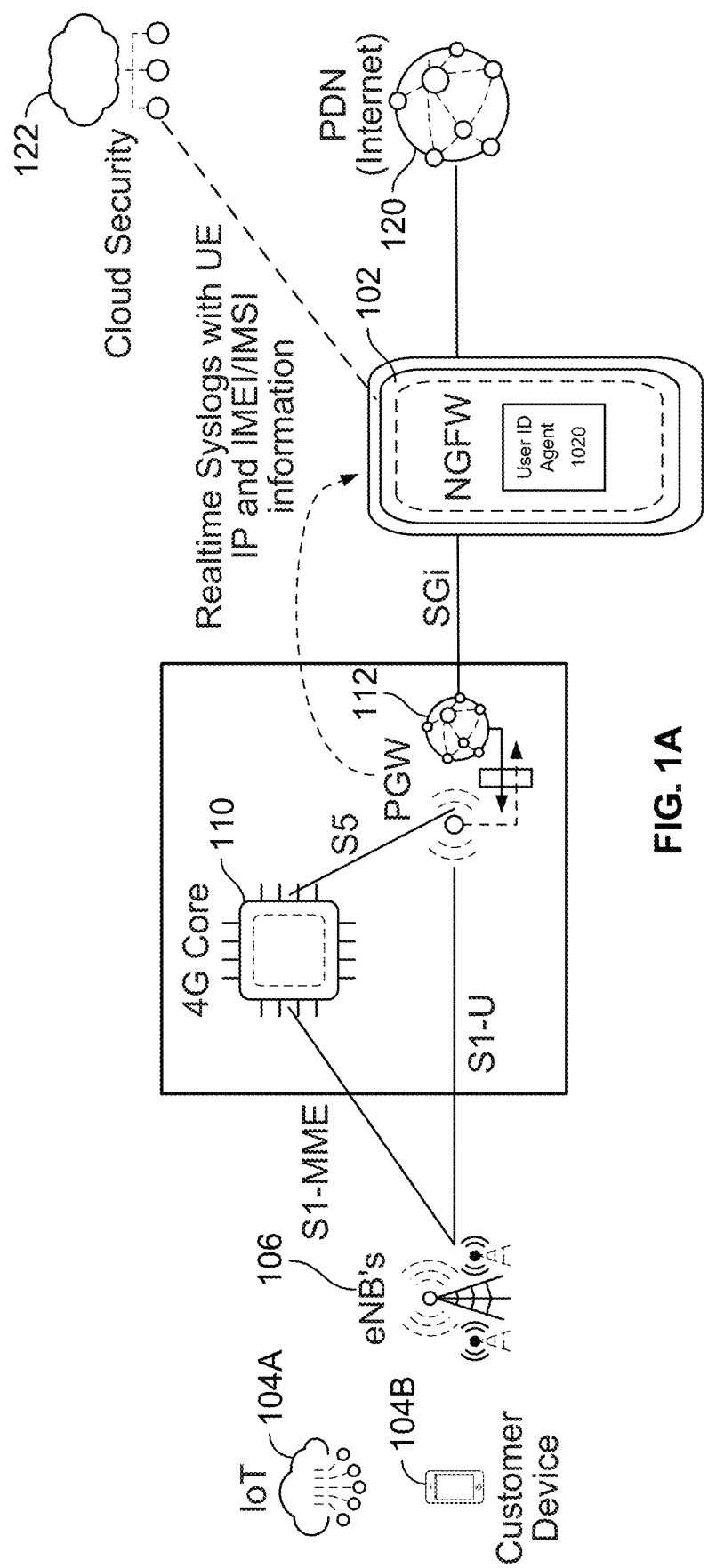
FIG. 1A is a block diagram of an architecture of a 4G/LTE wireless network with a security platform for applying subscriber-ID based security in mobile networks with user-ID and syslog messages networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID' (e.g., User ID) for user identification (e.g., by user or user group), and Content-ID' (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Applying Subscriber-ID Based Security, Equipment-ID Based Security, and/or Network Slice-ID Based Security With User-ID and Syslog Messages in Mobile Networks Technical and security challenges with service provider networks exist for devices in mobile networks (e.g., 4G/LTE and 5G mobile networks). For example, some private 4G/LTE and private 5G networks do not expose 3GPP interfaces between network functions, which prevents deployment of security solutions (e.g., a network gateway firewall (NFGW) or other security entities) on these interfaces to apply context-based security to network traffic. Moreover, some mobile service providers are reluctant to deploy such security solutions on various interfaces (e.g., 3GPP interfaces) due to concerns over potential latency and service outages.

As such, what are needed are new and improved security techniques for devices communicating on such service provider network environments (e.g., mobile networks, including various 4G/LTE and 5G mobile networks). Specifically, what are needed are new and improved solutions for monitoring such network traffic and applying context-based security policies (e.g., security/firewall policies) for devices communicating on service provider networks, including for applying subscriber-ID based security, equipment-ID based security, and/or network slice-ID based security in mobile networks with user-ID and syslog messages.

In some embodiments, a system/process/computer program product for applying subscriber-ID based security with user-ID and syslog messages in mobile networks includes monitoring network traffic on a mobile network at a security platform to identify a new session; extracting a plurality of parameters by parsing syslog messages with a user-ID agent at the security platform; and enforcing a security policy on the new session at the security platform based on one or more of the plurality of parameters including a subscriber-ID to apply context-based security in the mobile network.

For example, the above-described techniques can be performed to apply Subscriber-ID based security over an N6 interface in a private 5G network and/or over an SGi interface in a private 4G/LTE network.

As another example, the above-described techniques can be performed to apply known and unknown threat identification and prevention over an N6 interface in a 5G network and/or over an SGi interface in a 4G/LTE network.

As yet another example, the above-described techniques can be performed to apply Application Identification over an N6 interface in a 5G network and/or over an SGi interface in a 4G/LTE network.

As yet another example, the above-described techniques can be performed to apply URL filtering over an N6 interface in a 5G network and/or over an SGi interface in a 4G/LTE network.

As such, service providers and/or enterprises can use the disclosed techniques and security platform to apply subscriber-ID based security over IP-based external network (e.g., the Internet) perimeters.

In some embodiments, a system/process/computer program product for applying equipment-ID based security with user-ID and syslog messages in mobile networks includes monitoring network traffic on a mobile network at a security platform to identify a new session; extracting a plurality of parameters by parsing syslog messages with a user-ID agent at the security platform; and enforcing a security policy on the new session at the security platform based on one or more of the plurality of parameters including an equipment-ID to apply context-based security in the mobile network.

For example, the above-described techniques can be performed to apply equipment-ID based security over an N6 interface in a private 5G network and/or over an SGi interface in a private 4G/LTE network.

As another example, the above-described techniques can be performed to apply known and unknown threat identification and prevention over an N6 interface in a 5G network and/or over an SGi interface in a 4G/LTE network.

As yet another example, the above-described techniques can be performed to apply Application Identification over an N6 interface in a 5G network and/or over an SGi interface in a 4G/LTE network.

As yet another example, the above-described techniques can be performed to apply URL filtering over an N6 interface in a 5G network and/or over an SGi interface in a 4G/LTE network.

As such, service providers and/or enterprises can use the disclosed techniques and security platform to apply equipment-ID based security over IP-based external network (e.g., the Internet) perimeters.

In some embodiments, a system/process/computer program product for applying network slice-ID based security with user-ID and syslog messages in mobile networks includes monitoring network traffic on a mobile network at a security platform to identify a new session; extracting a plurality of parameters by parsing syslog messages with a user-ID agent at the security platform; and enforcing a security policy on the new session at the security platform based on one or more of the plurality of parameters including a network slice-ID to apply context-based security in the mobile network.

For example, the above-described techniques can be performed to apply network slice-ID based security over an N6 interface in a private 5G network.

As another example, the above-described techniques can be performed to apply known and unknown threat identification and prevention over an N6 interface in a 5G network.

As yet another example, the above-described techniques can be performed to apply Application Identification over an N6 interface in a 5G network.

As yet another example, the above-described techniques can be performed to apply URL filtering over an N6 interface in a 5G network.

As such, service providers and/or enterprises can use the disclosed techniques and security platform to apply network slice-ID based security over IP-based external network (e.g., the Internet) perimeters. Moreover, the disclosed techniques can be performed to apply subscriber-ID based security, equipment-ID based security, and/or network slice-ID based security in mobile networks with user-ID and syslog messages for security policy enforcement in mobile networks using a security platform (e.g., including when the security platform is not inline in a core mobile network, such as for private 4G networks, private 5G networks, etc.).

As such, mobile network operators can use the disclosed techniques for applying subscriber-ID based security, equipment-ID based security, and/or network slice-ID based security in mobile networks with user-ID and syslog messages using such a security platform (e.g., security platforms can also be configured to distinct deployment/operating environments for monitoring such network traffic and applying context-based security policies (e.g., security/firewall policies) for devices communicating on service provider networks, including for applying subscriber-ID based security, equipment-ID based security, and/or network slice-ID based security in mobile networks with user-ID and syslog messages, including office deployment/operating environments, enterprise deployment/operating environments, and factory deployment/operating environments), such as will be further described below.

As such, the disclosed techniques facilitate enhanced context-based security in mobile networks. For example, security functions (e.g., security platforms) can be located closer to the user/device (e.g., UE) for performing security policy analysis and enforcement. As another example, security functions can be implemented to facilitate security for selective industry verticals. As yet another example, security can be implemented in highly sensitive locations, such as government network environments, military network environments, and power plant or other critical infrastructure network environments.

Accordingly, new and improved security solutions that facilitate applying security (e.g., network-based security) using a security platform for performing the disclosed techniques for applying subscriber-ID based security, equipment-ID based security, and/or network slice-ID based security in mobile networks with user-ID and syslog messages (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) in a mobile network (e.g., a 4G/5G/6G/later versions of mobile networks) on various interfaces and protocols in mobile network environments are disclosed in accordance with some embodiments.

These and other embodiments and examples for applying subscriber-ID based security, equipment-ID based security, and/or network slice-ID based security in mobile networks with user-ID and syslog messages networks will be further described below.

Example System Architectures for Applying Subscriber-ID Based Security With User-ID and Syslog Messages in Mobile Networks Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over various interfaces (e.g., RESTful APIs; N3, N6, and/or other interfaces in a 4G/5G/6G core network) to apply security on user plane traffic based on a policy (e.g., layer-7 security and/or other security policy enforcement) as further described below.

FIG. 1A is a block diagram of an architecture of a 4G/LTE wireless network with a security platform for applying subscriber-ID based security in mobile networks with user-ID and syslog messages networks in accordance with some embodiments. Specifically, FIG. 1A is an example 4G/LTE mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying subscriber-ID based security in mobile networks with user-ID and syslog messages networks over various interfaces (e.g., SGi and/or other interfaces in a 4G/LTE core network, and N6 interfaces and/or other interfaces in a 5G core network) in mobile networks (e.g., 4G/LTE or later mobile networks) as further described below.

As referred to herein, IMSI is the concept referred to by ITU-T as the "International Mobile Subscription Identity." IMSI is a 14 or 15 digit number.

As also referred to herein, SUPI is a globally unique 5G "Subscription Permanent Identifier" allocated to each subscriber in the 5G system. As per 3GPP T. S 23.003 v 16.9.0, a SUPI type may indicate an IMSI, a network access identifier (NAI), a Global Line Identifier (GLI), or a Global Cable Identifier (GCI).

As also referred to herein, International Mobile Equipment Identifier (IMEI) is defined in 3GPP TS 23.003 available at portal.3gpp.org.

As shown in FIG. 1A, the 4G/LTE mobile network environment can also include 4G Radio Access Network (RAN) access as shown at 106 and/or other networks including, for example, Wi-Fi access and Fixed access (not shown), to facilitate data communications for subscribers (e.g., using User Equipment (UE), such as smart phones, laptops, computers (which may be in a fixed location), and/or other cellular enabled computing devices/equipment, such as IoT devices as shown at 104A and/or UEs, such as a customer device as shown at 104B, or other network communication enabled devices) including over a Packet Data Network (PDN) (e.g., the Internet) 120 to access various applications, web services, content hosts, etc. and/or other networks. Each of the above-described 4G/LTE network access mechanisms are in communication with a 4G Core Network 110 that includes a Packet Data Network Gateway (PGW) 112. PGW 112 is in communication with PDN 120 via an SGi interface in which Security Platform 102 is located in line between PGW 112 and PDN 120. Security Platform 102 is in communication with PGW 112 (e.g., via the SGi interface, as shown) to access real-time syslog data with UE IP address and IMEI/IMSI information as will be further described below.

Referring to FIG. 1A, network traffic communications are monitored using Security Platform 102. As shown, network traffic communications are monitored/filtered in the 4G/LTE network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., SGi and/or other interfaces in a 4G/LTE core network, and N6 interfaces and/or other interfaces in a 5G core network) in mobile networks as similarly described above and as further described below.

In this example implementation, the disclosed techniques for applying subscriber-ID based security in mobile networks with user-ID and syslog messages networks can be performed using a security platform deployed in a 4G/LTE technology-based mobile network, such as shown in FIG. 1A. Specifically, mobile networks have network functions that can generate syslog messages for certain events like bearer creation and bearer deletion. These network functions can be configured to send syslog messages that contain information about bearer creation and deletion events. A User-ID agent 1020 in the security platform can be configured to parse those messages. For example, the User-ID agent can be configured to parse for creation events to map User Equipment (UE) IP addresses to Subscriber IDs and to also parse for deletion events to delete outdated mappings. Deleting outdated mappings is generally useful in mobile networks where IP address assignments can change when, for example, a UE is rebooted or during various other scenarios. As such, in some embodiments, syslog parse profiles are used to parse syslog messages to integrate with network functions from different equipment vendors, which can send syslog messages in different formats (e.g., users can create a custom profile for each format).

In some embodiments, a security platform is further configured to provide the following DPI capabilities: DPI of IP traffic over the SGi interface. In an example implementation, the security platform is configured to provide DPI capabilities (e.g., including to identify an APP ID, a user ID, a content ID, perform URL filtering) of, for example, IP sessions over SGi interfaces between PGW 112 and PDN 120 to apply security on user plane traffic based on a policy (e.g., layer-7 security and/or other security policy enforcement) as further described below.

In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

FIG. 2A is an example screen diagram for an interface of a security platform at the SGi interface in L3 mode receiving syslog messages from the PGW in a 4G/LTE network in accordance with some embodiments. In this example, the PGW sends event syslogs (e.g., syslog messages) to the security platform (e.g., NGFW 102) whenever a new default bearer is created or deleted. Each syslog contains different fields, key fields to highlight: Event type, IMSI, IMEI, APN, and Ue_IP.

Below is an example of a syslog message generated by the PGW.

---

Jan 9 08:12:14 { "pgw", "type": "create_session", "evt": { "imsi": "002002999971493", "imei": "3526201120836534", "apn": "apn2a6", "user_addr": [ "172.16.15.159" ] } }

---

The security platform (e.g., NGFW 102) receives the event syslog and creates a User-ID/IP mapping. The User-ID can be configured as the UE IMSI, e.g., "002002999971493". The syslog with event "create session" can be configured as a User-ID Login action whereas the "delete session" can be used as a Logout action.

Referring to FIG. 2A, the example screen diagram for an interface of a security platform at the SGi interface in L3 mode receiving syslog messages from the PGW in a 4G/LTE network provides an example of a security policy configured with User-ID as UE IMSI="002002999971493".

Figure 1B:
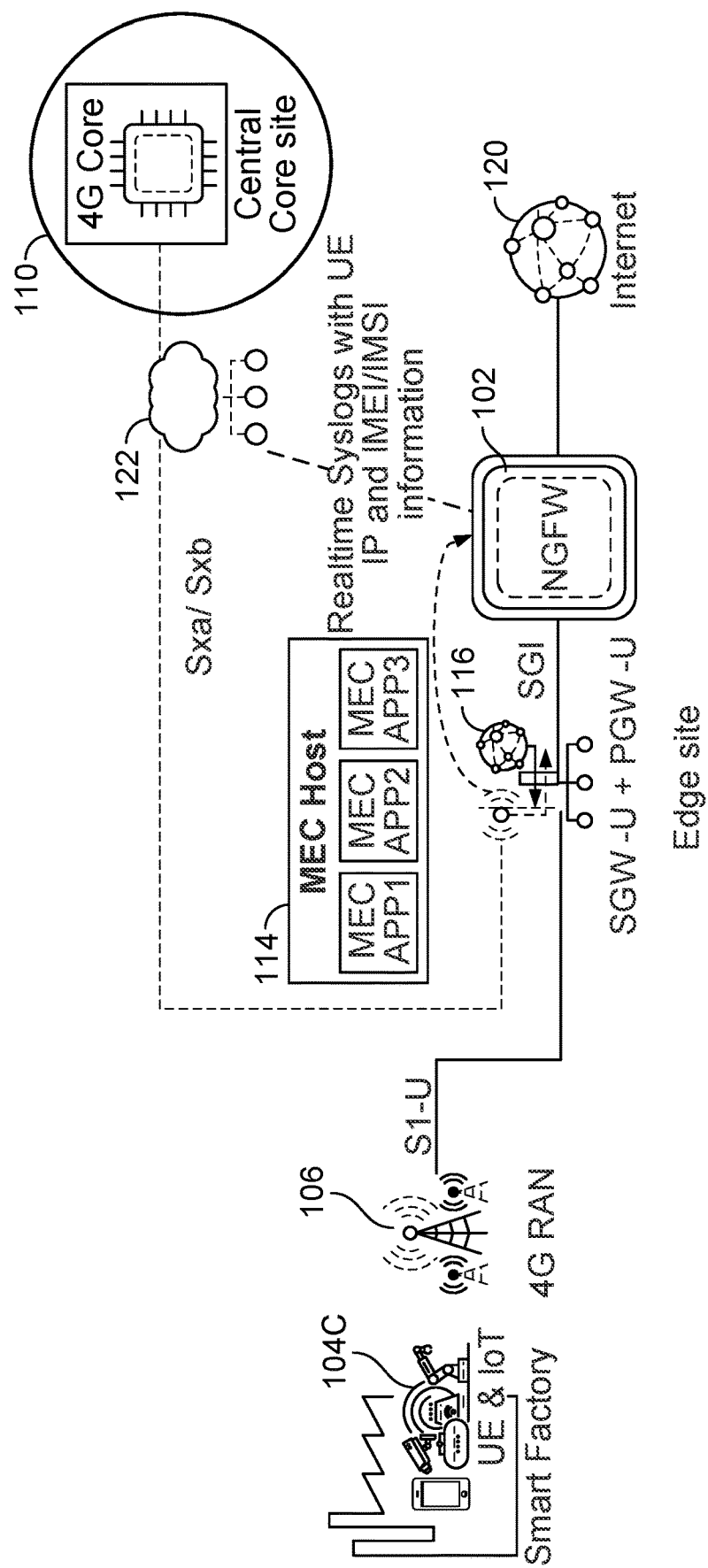
FIG. 1B is another block diagram of an architecture of a 4G/LTE wireless network with a security platform for applying subscriber-ID based security in mobile networks with user-ID and syslog messages networks in accordance with some embodiments.

FIG. 1B is another block diagram of an architecture of a 4G/LTE wireless network with a security platform for applying subscriber-ID based security in mobile networks with user-ID and syslog messages networks in accordance with some embodiments. Specifically, FIG. 1B is an example 4G/LTE mobile network environment that includes a Security Platform 102 deployment in a 4G/LTE Mobile Edge Computing (MEC) 114 environment that includes a plurality of MEC applications (APPs) as shown in FIG. 1B (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying subscriber-ID based security in mobile networks with user-ID and syslog messages networks over various interfaces (e.g., SGi and/or other interfaces in a 4G/LTE core network, and N6 interfaces and/or other interfaces in a 5G core network) in mobile networks (e.g., 4G/LTE or later mobile networks) as further described below.

As shown in FIG. 1B, the 4G/LTE mobile network environment can also include 4G Radio Access Network (RAN) access as shown at 106 and/or other networks including, for example, Wi-Fi access and Fixed access (not shown), to facilitate data communications for subscribers (e.g., using User Equipment (UE), such as smart phones, laptops, computers (which may be in a fixed location), and/or other cellular enabled computing devices/equipment, such as a Smart Factory including UE and IoT devices as shown at 104C, or other network communication enabled devices) including over a Packet Data Network (PDN) (e.g., the Internet) 120 to access various applications, web services, content hosts, etc. and/or other networks. Each of the above-described 4G/LTE network access mechanisms are in communication with a 4G Core Network 110 (e.g., shown as a Central Core site in FIG. 1B). As also shown, 4G RAN 106 is in network communication over an Sl-U interface to a Serving Gateway User Plane Function (SGW-U) and a Packet Network Data Gateway Function (PGW-U) as shown at 116 in FIG. 1B. SGW-U and PGW-U 116 is in communication with PDN/Internet 120 via an SGi interface in which Security Platform 102 is located in line between SGW-U and PGW-U 116 and PDN/Internet 120. Security Platform 102 is in communication with SGW-U and PGW-U 116 (e.g., via the SGi interface, as shown) to access real-time syslog data with UE IP address and IMEI/IMSI information as similarly described above and as will be further described below. SGW-U and PGW-U 116 are also in communication with 4G Core 110 via Sxa/Sxb interfaces as shown in FIG. 1B.

Referring to FIG. 1B, network traffic communications are monitored using Security Platform 102. As shown, network traffic communications are monitored/filtered in the 4G/LTE network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., SGi and/or other interfaces in a 4G/LTE core network, and N6 interfaces and/or other interfaces in a 5G core network) in mobile networks as similarly described above and as further described below.

In this example implementation, the disclosed techniques for applying subscriber-ID based security in mobile networks with user-ID and syslog messages networks can be performed using a security platform deployed in a 4G/LTE technology-based mobile network, such as shown in FIG. 1B. Specifically, mobile networks have network functions that can generate syslog messages for certain events like bearer creation and bearer deletion. These network functions can be configured to send syslog messages that contain information about bearer creation and deletion events. A User-ID agent in the security platform can be configured to parse those messages. For example, the User-ID agent can be configured to parse for creation events to map User Equipment (UE) IP addresses to Subscriber IDs and to also parse for deletion events to delete outdated mappings. Deleting outdated mappings is generally useful in mobile networks where IP address assignments can change when, for example, a UE is rebooted or during various other scenarios. As such, in some embodiments, syslog parse profiles are used to parse syslog messages to integrate with network functions from different equipment vendors, which can send syslog messages in different formats (e.g., users can create a custom profile for each format).

In some embodiments, a security platform is further configured to provide the following DPI capabilities: DPI of IP traffic over the SGi interface. In an example implementation, the security platform is configured to provide DPI capabilities (e.g., including to identify an APP ID, a user ID, a content ID, perform URL filtering) of, for example, IP sessions over SGi interfaces between SGW-U and PGW-U 116 and PDN 120 to apply security on user plane traffic based on a policy (e.g., layer-7 security and/or other security policy enforcement) as further described below.

In addition, Security Platform 102 can also be in network communication with a Cloud Security Service 122 (e.g., a commercially available cloud-based security service, such as the WildFire' cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Figure 1C:
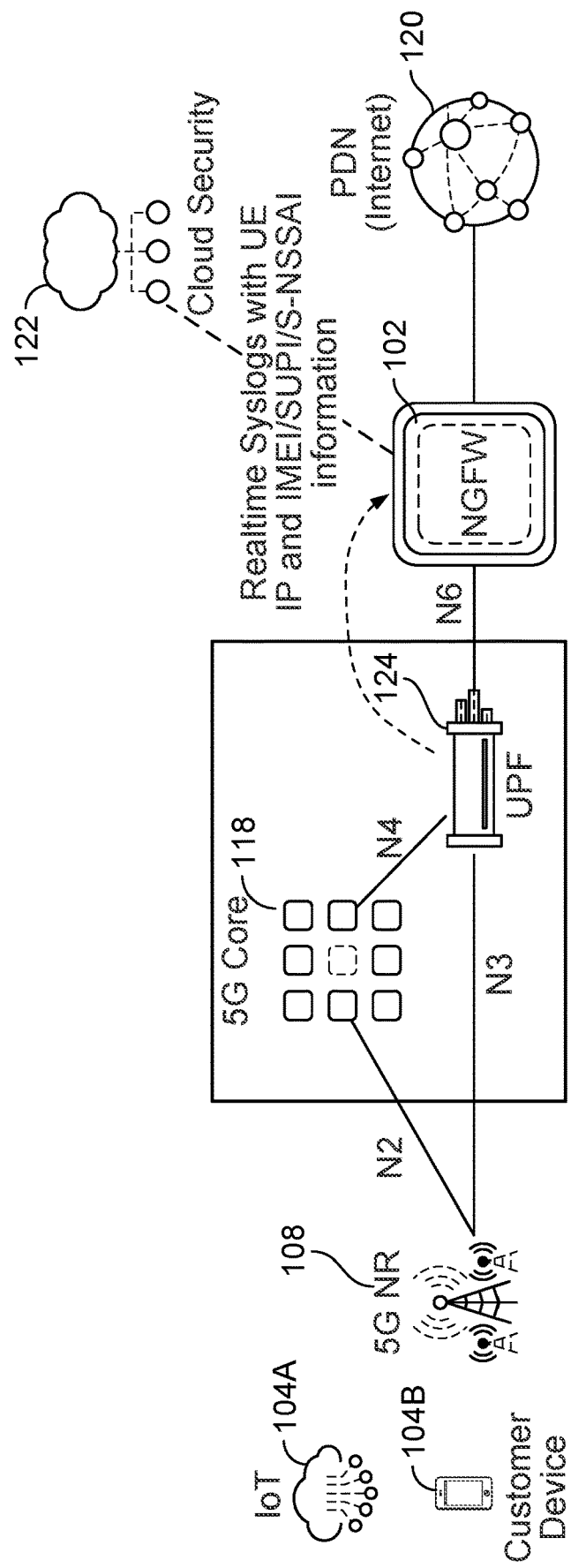
FIG. 1C is a block diagram of an architecture of a 5G wireless network with a security platform for applying subscriber-ID based security in mobile networks with user-ID and syslog messages networks in accordance with some embodiments.

FIG. 1C is a block diagram of an architecture of a 5G wireless network with a security platform for applying subscriber-ID based security in mobile networks with user-ID and syslog messages networks in accordance with some embodiments. Specifically, FIG. 1C is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying subscriber-ID based security in mobile networks with user-ID and syslog messages networks over various interfaces (e.g., SGi and/or other interfaces in a 4G/LTE core network, and N6 interfaces and/or other interfaces in a 5G core network) in mobile networks (e.g., 5G or later mobile networks) as further described below.

As shown in FIG. 1C, the 5G mobile network environment can also include 5G New Radio (NR) Radio Access Network (RAN) access as shown at 108 and/or other networks including, for example, Wi-Fi access and Fixed access (not shown), to facilitate data communications for subscribers (e.g., using User Equipment (UE), such as smart phones, laptops, computers (which may be in a fixed location), and/or other cellular enabled computing devices/equipment, such as IoT devices as shown at 104A and/or UEs, such as a customer device as shown at 104B, or other network communication enabled devices) including over a Packet Data Network (PDN) (e.g., the Internet) 120 to access various applications, web services, content hosts, etc. and/or other networks. Each of the above-described 5G network access mechanisms are in communication with a 5G Core Network 118 that includes a 5G Mobile Core User Plane Function (UPF) 124. UPF 124 is in communication with PDN 120 via an N6 interface in which Security Platform 102 is located in line between UPF 124 and PDN 120. Security Platform 102 is in communication with UPF 124 (e.g., via the N6 interface, as shown) to access real-time syslog data with UE IP address and IMEI/IMSI information as will be further described below.

Referring to FIG. 1C, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., SGi and/or other interfaces in a 4G/LTE core network, and N6 interfaces and/or other interfaces in a 5G core network) in mobile networks as similarly described above and as further described below.

In this example implementation, the disclosed techniques for applying subscriber-ID based security in mobile networks with user-ID and syslog messages networks can be performed using a security platform deployed in a 4G/LTE technology-based mobile network, such as shown in FIG. 1C. Specifically, mobile networks have network functions that can generate syslog messages for certain events like bearer creation and bearer deletion. These network functions can be configured to send syslog messages that contain information about bearer creation and deletion events. A User-ID agent in the security platform can be configured to parse those messages. For example, the User-ID agent can be configured to parse for creation events to map User Equipment (UE) IP addresses to Subscriber IDs and to also parse for deletion events to delete outdated mappings. Deleting outdated mappings is generally useful in mobile networks where IP address assignments can change when, for example, a UE is rebooted or during various other scenarios. As such, in some embodiments, syslog parse profiles are used to parse syslog messages to integrate with network functions from different equipment vendors, which can send syslog messages in different formats (e.g., users can create a custom profile for each format).

In some embodiments, a security platform is further configured to provide the following DPI capabilities: DPI of IP traffic over the N6 interface. In an example implementation, the security platform is configured to provide DPI capabilities (e.g., including to identify an APP ID, a user ID, a content ID, perform URL filtering) of, for example, IP sessions over N6 interfaces between UPF 124 and PDN 120 to apply security on user plane traffic based on a policy (e.g., layer-7 security and/or other security policy enforcement) as further described below.

In addition, Security Platform 102 can also be in network communication with a Cloud Security Service 122 (e.g., a commercially available cloud-based security service, such as the WildFire' cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Figure 2B:
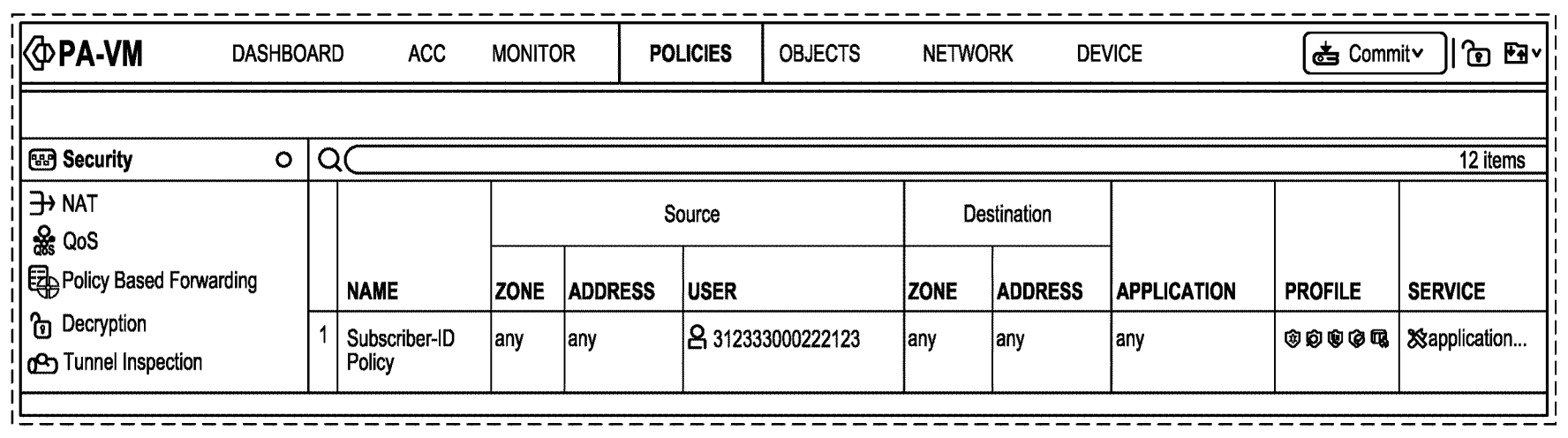

FIG. 2B is an example screen diagram for an interface of a security platform at the N6 interface in L3 mode receiving syslog messages from the UPF in a 5G network in accordance with some embodiments. In this example, the UPF sends event syslogs (e.g., syslog messages) to the security platform (e.g., NGFW 102) whenever a new PDU session is created or deleted. Each syslog contains different fields, key fields to highlight: Event type, IMSI, IMEI, DNN, S-NSSAI, and Ue_IP.

Below is an example of a syslog message generated by the UPF.

```
Jan 13 10:16:15 { "upf", "type": "create_pdu_session", "evt": { "imsi":
"312333000222123", "imei": "4441221130832222", "dnn": "dnn1bc4", "s-nssai": "1:1000",
"user_addr": [ "172.16.15.171" ] } }
```

The security platform (e.g., NGFW 102) receives the event syslog and creates a User-ID/IP mapping. The User-ID can be configured as the UE IMSI, e.g., "312333000222123". The syslog with event "create session" can be configured as a User-ID Login action whereas the "delete session" can be used as a Logout action.

Referring to FIG. 2B, the example screen diagram for an interface of a security platform at the N6 interface in L3 mode receiving syslog messages from the UPF in a 5G network provides an example of a security policy configured with User-ID as UE IMSI="312333000222123".

Figure 1D:
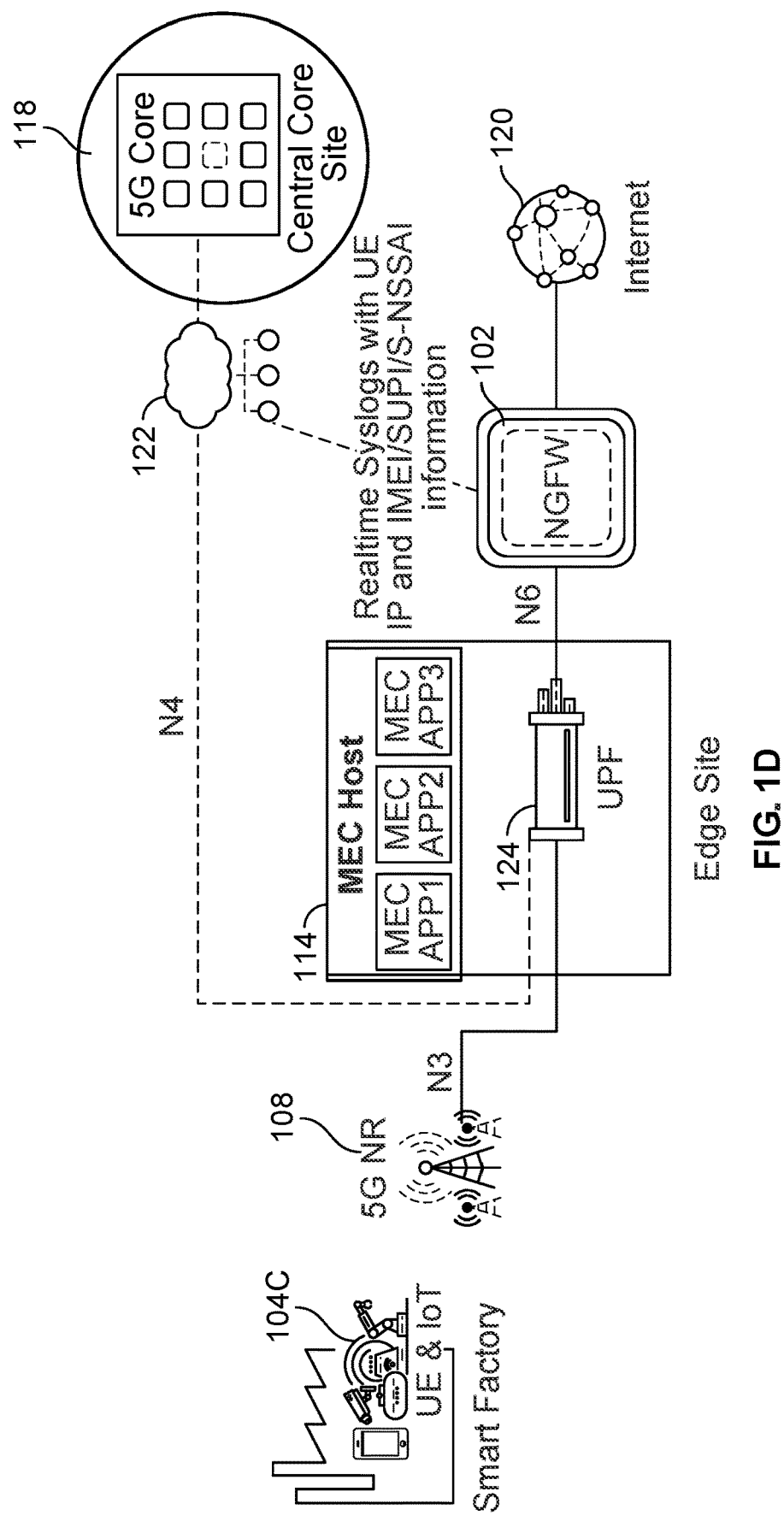
FIG. 1D is another block diagram of an architecture of a 5G wireless network with a security platform for applying subscriber-ID based security in mobile networks with user-ID and syslog messages networks in accordance with some embodiments.

FIG. 1D is another block diagram of an architecture of a 5G wireless network with a security platform for applying subscriber-ID based security in mobile networks with user-ID and syslog messages networks in accordance with some embodiments. Specifically, FIG. 1D is an example 5G mobile network environment that includes a Security Platform 102 deployment in a 5G Mobile Edge Computing (MEC) 114 environment that includes a plurality of MEC applications (APPs) as shown in FIG. 1D (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying subscriber-ID based security in mobile networks with user-ID and syslog messages networks over various interfaces (e.g., SGi and/or other interfaces in a 4G/LTE core network, and N6 interfaces and/or other interfaces in a 5G core network) in mobile networks (e.g., 5G or later mobile networks) as further described below.

As shown in FIG. 1D, the 5G mobile network environment can also include 5G New Radio (NR) Radio Access Network (RAN) access as shown at 108, respectively, and/or other networks including, for example, Wi-Fi access and Fixed access (not shown), to facilitate data communications for subscribers (e.g., using User Equipment (UE), such as smart phones, laptops, computers (which may be in a fixed location), and/or other cellular enabled computing devices/equipment, such as a Smart Factory including UE and IoT devices as shown at 104C, or other network communication enabled devices) including over a Packet Data Network (PDN) (e.g., the Internet) 120 to access various applications, web services, content hosts, etc. and/or other networks. Each of the above-described 5G network access mechanisms are in communication with a 5G Core Network 118 (e.g., shown as a Central Core site in FIG. 1D). As also shown, 5G NR RAN 108 is in network communication over an N3 interface to UPF as shown at 124 in FIG. 1D. UPF 124 is in communication with PDN/Internet 120 via an N6 interface in which Security Platform 102 is located in line between UPF 124 and PDN/Internet 120. Security Platform 102 is in communication with UPF (e.g., via the N6 interface, as shown) to access real-time syslog data with UE IP address and IMEI/IMSI information as similarly described above and as will be further described below. UPF 124 is also in communication with 5G Core 118 via an N4 interface as shown in FIG. 1D.

Referring to FIG. 1D, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., SGi and/or other interfaces in a 4G/LTE core network, and N6 interfaces and/or other interfaces in a 5G core network) in mobile networks as similarly described above and as further described below.

In this example implementation, the disclosed techniques for applying subscriber-ID based security in mobile networks with user-ID and syslog messages networks can be performed using a security platform deployed in a 5G technology-based mobile network, such as shown in FIG. 1D. Specifically, mobile networks have network functions that can generate syslog messages for certain events like bearer creation and bearer deletion. These network functions can be configured to send syslog messages that contain information about bearer creation and deletion events. A User-ID agent in the security platform can be configured to parse those messages. For example, the User-ID agent can be configured to parse for creation events to map User Equipment (UE) IP addresses to Subscriber IDs and to also parse for deletion events to delete outdated mappings. Deleting outdated mappings is generally useful in mobile networks where IP address assignments can change when, for example, a UE is rebooted or during various other scenarios. As such, in some embodiments, syslog parse profiles are used to parse syslog messages to integrate with network functions from different equipment vendors, which can send syslog messages in different formats (e.g., users can create a custom profile for each format).

In some embodiments, a security platform is further configured to provide the following DPI capabilities: DPI of IP traffic over the N6 interface. In an example implementation, the security platform is configured to provide DPI capabilities (e.g., including to identify an APP ID, a user ID, a content ID, perform URL filtering) of, for example, IP sessions over N6 interfaces between UPF 124 and PDN 120 to apply security on user plane traffic based on a policy (e.g., layer-7 security and/or other security policy enforcement) as further described below.

In addition, Security Platform 102 can also be in network communication with a Cloud Security Service 122 (e.g., a commercially available cloud-based security service, such as the WildFire' cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

For example, the above-described techniques can be performed to apply subscriber-ID based security over an N6 interface in a private 5G network and/or over an SGi interface in a private 4G/LTE network.

As another example, the above-described techniques can be performed to apply known and unknown threat identification and prevention over an N6 interface in a 5G network and/or over an SGi interface in a 4G/LTE network.

As yet another example, the above-described techniques can be performed to apply Application Identification over an N6 interface in a 5G network and/or over an SGi interface in a 4G/LTE network.

As yet another example, the above-described techniques can be performed to apply URL filtering over an N6 interface in a 5G network and/or over an SGi interface in a 4G/LTE network.

As such, service providers and/or enterprises can use the disclosed techniques and security platform to apply subscriber-ID based security over IP-based external network (e.g., the Internet) perimeters.

Example System Architectures for Applying Equipment-ID Based Security With User-ID and Syslog Messages in Mobile Networks Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over various interfaces (e.g., RESTful APIs; N3, N6, and/or other interfaces in a 4G/5G/6G core network) to apply security on user plane traffic based on a policy (e.g., layer-7 security and/or other security policy enforcement) as further described below.

As referred to herein, International Mobile Equipment Identifier (IMEI) is defined in 3GPP TS 23.003 available at portal.3gpp.org. The Mobile Station Equipment is uniquely defined by the IMEI or the IMEISV. IMEI is 15 digits, and IMEISV is 16 digits (e.g., these values consist of decimal digits only).

As also referred to herein, in 5G network environments, the Permanent Equipment Identifier (PEI) identifies a UE. As per 3GPP T.S 23.003 v 16.9.0, a PEI type: may indicate an IMEI or IMEISV, a MAC address or an IEEE Extended Unique Identifier (EUI-64).

In some embodiments, applying equipment-ID (e.g., including IMEI and/or PEI) based security in mobile networks with user-ID and syslog messages is similarly performed using a security platform deployed on an SGi interface in a 4G/LTE network, such as similarly described above with respect to FIGS. 1A and 1B, and/or on an N6 interface in a 5G network, such as similarly described above with respect to FIGS. 1C and 1D.

In an example implementation, the disclosed techniques for applying equipment-ID based security in mobile networks with user-ID and syslog messages networks can be performed using a security platform deployed in a 4G/LTE technology-based mobile network, such as similarly shown in FIGS. 1A and 1B, except in this example, the security platform (e.g., NGFW 102) uses the SGi interface to obtain real-time syslogs with UE IP and IMEI information from PGW 112 and from SGW-U and PGW-U 116, respectively, and deployed in a 5G technology-based mobile network such as similarly shown in FIGS. 1C and 1D, except in this example, the security platform (e.g., NGFW 102) uses the N6 interface to obtain real-time syslogs with UE IP and IMEI information from UPF 124. Specifically, mobile networks have network functions that can generate syslog messages for certain events like bearer creation and bearer deletion. These network functions can be configured to send syslog messages that contain information about bearer creation and deletion events. A User-ID agent in the security platform can be configured to parse those messages. For example, the User-ID agent can be configured to parse for creation events to map User Equipment (UE) IP addresses to Equipment IDs and to also parse for deletion events to delete outdated mappings. Deleting outdated mappings is generally useful in mobile networks where IP address assignments can change when, for example, a UE is rebooted or during various other scenarios. As such, in some embodiments, syslog parse profiles are used to parse syslog messages to integrate with network functions from different equipment vendors, which can send syslog messages in different formats (e.g., users can create a custom profile for each format).

FIG. 2C is another example screen diagram for an interface of a security platform at the SGi interface in L3 mode receiving syslog messages from the PGW in a 4G/LTE network in accordance with some embodiments. In this example, the PGW sends event syslogs (e.g., syslog messages) to the security platform (e.g., NGFW 102) whenever a new default bearer is created or deleted. Each syslog contains different fields, key fields to highlight: Event type, IMSI, IMEI, APN, and Ue_IP.

Below is an example of a syslog message generated by the PGW.

```
Jan 9 09:13:10 { "pgw", "type": "create_session", "evt": { "imsi":
"002002999971493", "imei": "3526201120836534", "apn": "apn2a6", "user_addr": [
"172.16.15.101" ] } }
```

The security platform (e.g., NGFW 102) receives the event syslog and creates a User-ID/IP mapping. The User-ID can be configured as the UE IMEI, e.g., "3526201120836534". The syslog with event "create session" can be configured as a User-ID Login action whereas the "delete session" can be used as a Logout action.

Referring to FIG. 2C, the example screen diagram for an interface of a security platform at the SGi interface in L3 mode receiving syslog messages from the PGW in a 4G/LTE network provides an example of a security policy configured with User-ID as UE IMEI="3526201120836534".

For example, the above-described techniques can be performed to apply equipment-ID based security over an N6 interface in a private 5G network and/or over an SGi interface in a private 4G/LTE network.

As another example, the above-described techniques can be performed to apply known and unknown threat identification and prevention over an N6 interface in a 5G network and/or over an SGi interface in a 4G/LTE network.

As yet another example, the above-described techniques can be performed to apply Application Identification over an N6 interface in a 5G network and/or over an SGi interface in a 4G/LTE network.

As yet another example, the above-described techniques can be performed to apply URL filtering over an N6 interface in a 5G network and/or over an SGi interface in a 4G/LTE network.

As such, service providers and/or enterprises can use the disclosed techniques and security platform to apply equipment-ID based security over IP-based external network (e.g., the Internet) perimeters.

Example System Architectures for Applying Network Slice-ID Based Security with User-ID and Syslog Messages in Mobile Networks Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over various interfaces (e.g., RESTful APIs; N3, N6, and/or other interfaces in a 4G/5G/6G core network) to apply security on user plane traffic based on a policy (e.g., layer-7 security and/or other security policy enforcement) as further described below.

As will now be described, in some embodiments, Network Slice-ID/S-NSSAI(SST+SD) based security is performed with a security platform (e.g., NGFW 102) deployed on an N6 interface in a 5G network.

In order to identify a Network Slice end-to-end, the 5G standard uses information referred to as Single Network Slice Selection Assistance Information (S-NSSAI). The S-NSSAI may include both the SST and SD fields (e.g., in which case the S-NSSAI length is 32 bits in total), or the SNSSAI may just include the SST field (e.g., in which case the S-NSSAI length is 8 bits only).

A Slice/Service type (SST) field may have standardized and non-standardized values. Values 0 to 127 belong to the standardized SST range and they are defined in 3GPP TS 23.501. According to the 5G standard, the following SST must be supported in all log types and security policy in a network slice column. SST Values 128 to 255 belong to the Operator-specific range. A Slice Differentiator (SD) refers to optional information that complements the Slice/Service type(s) to differentiate amongst multiple Network Slices.

In some embodiments, applying network slice-ID (e.g., including S-NSSAI) based security in mobile networks with user-ID and syslog messages is similarly performed using a security platform deployed on an N6 interface in a 5G network, such as similarly described above with respect to FIGS. 1C and 1D.

In an example implementation, the disclosed techniques for applying network slice-ID based security in mobile networks with user-ID and syslog messages networks can be performed using a security platform deployed in a 5G technology-based mobile network such as similarly shown in FIGS. 1C and 1D, except in this example, the security platform (e.g., NGFW 102) uses the N6 interface to obtain real-time syslogs with UE IP and S-NSSAI information from UPF 124. Specifically, mobile networks have network functions that can generate syslog messages for certain events like bearer creation and bearer deletion. These network functions can be configured to send syslog messages that contain information about bearer creation and deletion events. A User-ID agent in the security platform can be configured to parse those messages. For example, the User-ID agent can be configured to parse for creation events to map IP addresses (e.g., User Equipment (UE) IP addresses) to Network Slice IDs and to also parse for deletion events to delete outdated mappings. Deleting outdated mappings is generally useful in mobile networks where IP address assignments can change when, for example, a UE is rebooted or during various other scenarios. As such, in some embodiments, syslog parse profiles are used to parse syslog messages to integrate with network functions from different equipment vendors, which can send syslog messages in different formats (e.g., users can create a custom profile for each format).

FIG. 2D is another example screen diagram for an interface of a security platform at the N6 interface in L3 mode receiving syslog messages from the UPF in a 5G network in accordance with some embodiments. In this example, the UPF sends event syslogs (e.g., syslog messages) to the security platform (e.g., NGFW 102) whenever a new PDU session is created or deleted. Each syslog contains different fields, key fields to highlight: Event type, IMSI, IMEI, DNN, S-NSSAI, and Ue_IP.

Below is an example of a syslog message generated by the UPF.

```
Jan 14 11:23:04 { "upf", "type": "create_pdu_session", "evt": { "imsi":
"312444555717000", "imei": "4442332341119898", "dnn": "dnn1bc4", "s-nssai": "1:1000",
"user_addr": [ "172.16.15.112" ] } }
```

The security platform (e.g., NGFW 102) receives the event syslog and creates a User-ID/IP mapping. The User-ID can be configured as the S-NSSAI, e.g., "1:1000". The syslog with event "create session" can be configured as a User-ID Login action whereas the "delete session" can be used as a Logout action.

Referring to FIG. 2D, the example screen diagram for an interface of a security platform at the N6 interface in L3 mode receiving syslog messages from the UPF in a 5G network provides an example of a security policy configured with User-ID as UE IMEI="1:1000".

For example, the above-described techniques can be performed to apply network slice-ID based security over an N6 interface in a private 5G network.

As another example, the above-described techniques can be performed to apply known and unknown threat identification and prevention over an N6 interface in a 5G network.

As yet another example, the above-described techniques can be performed to apply Application Identification over an N6 interface in a 5G network.

As yet another example, the above-described techniques can be performed to apply URL filtering over an N6 interface in a 5G network.

As such, service providers and/or enterprises can use the disclosed techniques and security platform to apply network slice-ID based security over IP-based external network (e.g., the Internet) perimeters.

Example Use Cases of Applying Subscriber-ID Based Security, Equipment-ID Based Security, and/or Network Slice-ID Based Security with User-ID and Syslog Messages in Mobile Networks The disclosed techniques for providing enhanced security for mobile/service provider networks using a security platform for security policy enforcement, including for applying subscriber-ID based security, equipment-ID based security, and/or network slice-ID based security in mobile networks with user-ID and syslog messages, can be applied in a variety of additional example use case scenarios for facilitating enhanced security for mobile networks (e.g., 4G/5G/6G and later mobile networks) as will now be described with respect to various example use cases.

As an example use case for subscriber-ID based security in mobile networks with user-ID and syslog message, the following example vulnerabilities can be detected and/or prevented for a group of enterprise 5G users using the above-described techniques applying subscriber-ID based security in mobile networks with user-ID and syslog messages using a security platform for security policy enforcement: (1) CVE-2021-30860: Apple Multiple Products Integer Overflow Vulnerability; (2) CVE-2022-22620L Apple Safari Use-After-Free Vulnerability; (3) CVE-2022-22784: Zoom XMPP Stanza Smuggling Vulnerability; and (4) CVE-2022-25235: Spring Security RegexRequestMatcher Authorization Bypass Vulnerability.

As example use cases for equipment-ID based security in mobile networks with user-ID and syslog message, the following enhanced security actions can be performed using the above-described techniques for applying equipment-ID based security in mobile networks with user-ID and syslog messages using a security platform for security policy enforcement: (1) detecting infected devices in a 5G network to block or limit their network access; and (2) applying application control for enterprise 5G devices (e.g., allow only trusted applications to communicate to intelligent sensors connected to a 5G network in a smart factory). Specifically, the following example vulnerabilities can be detected and/or prevented for a group of enterprise 5G users using the above-described techniques applying equipment-ID based security in mobile networks with user-ID and syslog messages using a security platform for security policy enforcement: (1) CVE-2022-25845: FastJson Deserialization Vulnerability; (2) CVE-2019-7671: Prima Systems FlexAir Cross-Site Scripting Vulnerability; (3) CVE-2019-7667: Prima Systems FlexAir Brute Force Information Disclosure Vulnerability; and (4) CVE-2021-23282: Eaton Intelligent Power Management Stored Cross-Site Scripting Vulnerability.

As example use cases for network slice-ID based security in mobile networks with user-ID and syslog message, the following enhanced security actions can be performed using the above-described techniques for applying network slice-ID based security in mobile networks with user-ID and syslog messages using a security platform for security policy enforcement: (1) investigating a security event related to, for example, a utilities vertical related enterprise 5G customer of security services; and (2) a mobile network service provider offering a bundled security with their 5G services to different enterprise customers. Specifically, the following examples of spyware can be detected and/or prevented for a group of enterprise 5G users using the above-described techniques applying equipment-ID based security in mobile networks with user-ID and syslog messages using a security platform for security policy enforcement: (1) Pingpull Command and Control Traffic; (2) APT34 Malicious Excel Downloader Traffic; (3) XANFPEZES Command and Control Traffic; and (4) Industroyer Command and Control Traffic.

As will now be apparent to one of ordinary skill in the art, the disclosed techniques for applying subscriber-ID based security, equipment-ID based security, and/or network slice-ID based security with user-ID and syslog messages using a security platform for security policy enforcement in mobile networks can be applied in a variety of additional example use case scenarios to detect/prevent these and other types of attacks for facilitating enhanced security for various deployments and environments in mobile networks.

Figure 3:
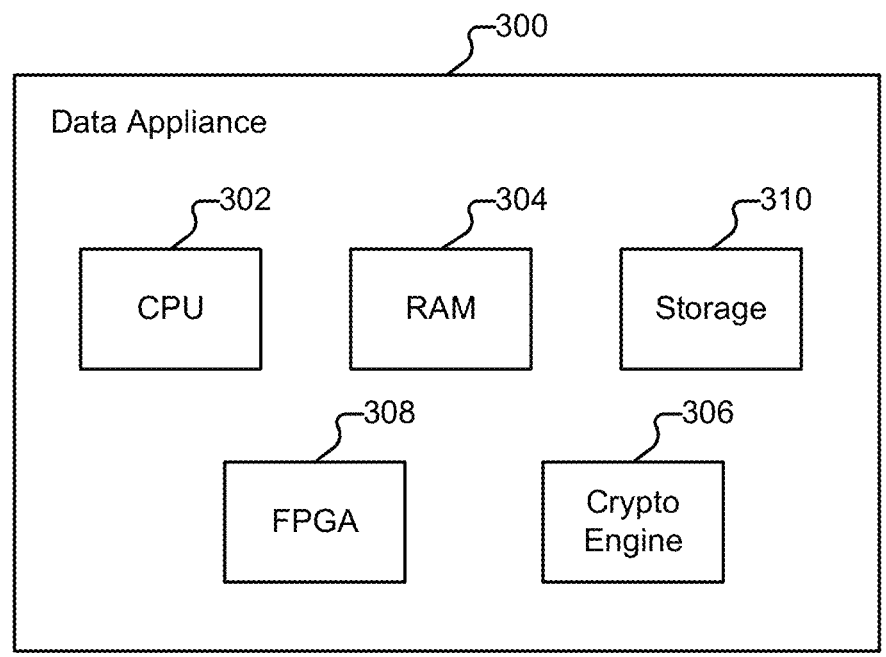
FIG. 3 is a functional diagram of hardware components of a network device for applying subscriber-ID based security, equipment-ID based security, and/or network slice-ID based security with user-ID and syslog messages in mobile networks in accordance with some embodiments.

Example Hardware Components of a Network Device for Applying Subscriber-ID Based Security, Equipment-ID Based Security, and/or Network Slice-ID Based Security with User-ID and Syslog Messages in Mobile Networks FIG. 3 is a functional diagram of hardware components of a network device for applying subscriber-ID based security, equipment-ID based security, and/or network slice-ID based security with user-ID and syslog messages in mobile networks in accordance with some embodiments. The example shown is a representation of physical/hardware components that can be included in network device 300 (e.g., an appliance, gateway, or server that can implement the security platform disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores certain information (e.g., subscriber-ID, equipment-ID, and/or network slice-ID along with user-ID and syslog messages related/extracted parameters) that is extracted from monitored traffic over various interfaces (e.g., SGi, N6, and/or other interfaces) that are monitored for implementing the disclosed security policy enforcement techniques for applying context-based security over various interfaces including the disclosed techniques for applying subscriber-ID based security, equipment-ID based security, and/or network slice-ID based security with user-ID and syslog messages in mobile networks using a security platform(s) as similarly described above with respect to FIGS. 1A-1D and 2A-2D. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
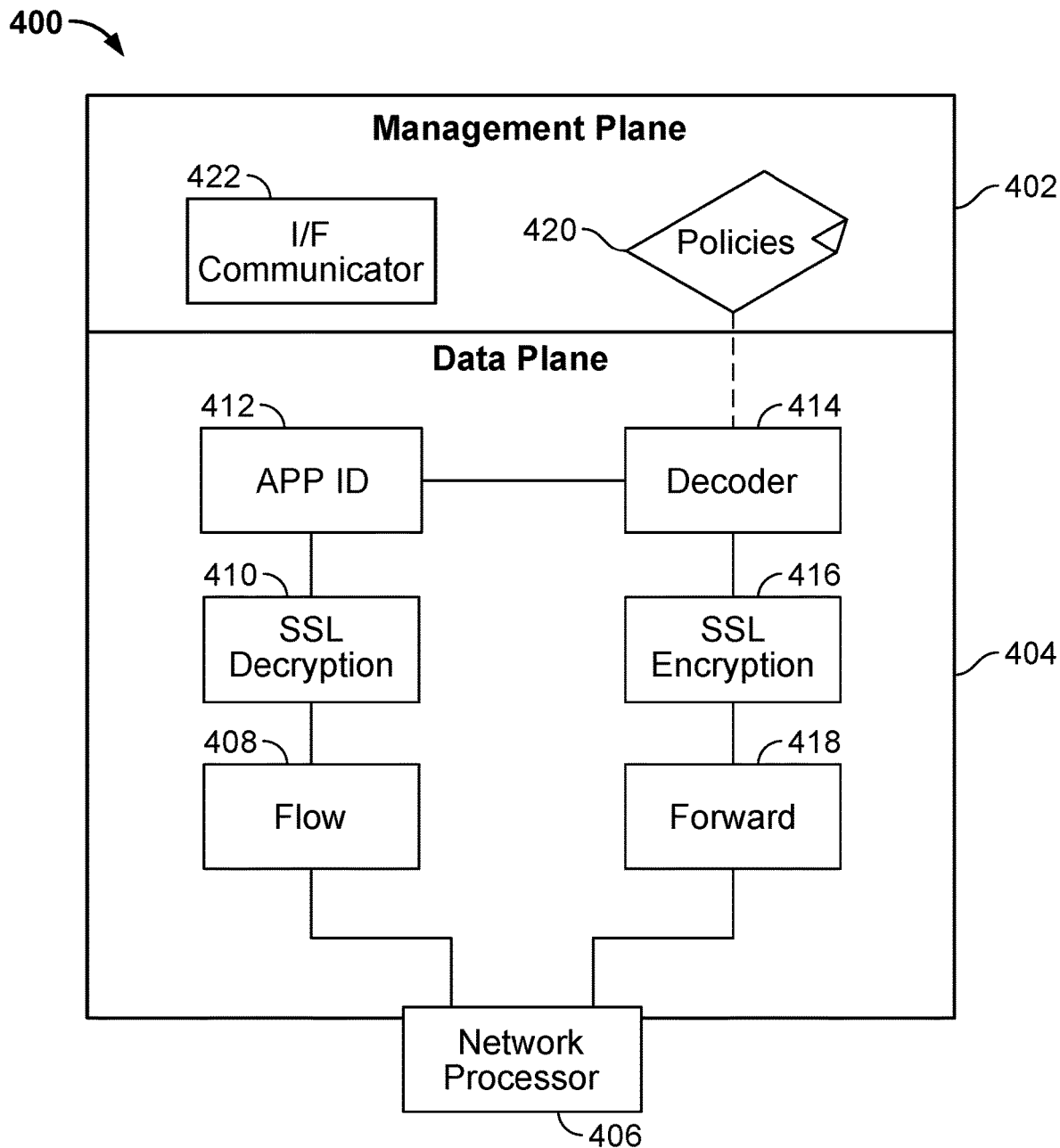
FIG. 4 is a functional diagram of logical components of a network device for applying subscriber-ID based security, equipment-ID based security, and/or network slice-ID based security with user-ID and syslog messages in mobile networks in accordance with some embodiments.

Example Logical Components of a Network Device for Applying Subscriber-ID Based Security, Equipment-ID Based Security, and/or Network Slice-ID Based Security with User-ID and Syslog Messages in Mobile Networks FIG. 4 is a functional diagram of logical components of a network device for applying subscriber-ID based security, equipment-ID based security, and/or network slice-ID based security with user-ID and syslog messages in mobile networks in accordance with some embodiments. The example shown is a representation of logical components that can be included in network device 400 (e.g., a data appliance, which can implement the disclosed security function/platform and perform the disclosed techniques for applying subscriber-ID based security, equipment-ID based security, and/or network slice-ID based security with user-ID and syslog messages in mobile networks). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, a MEC service, an IoT device, or another resource) using an encrypted session protocol, such as SSL. Network processor 406 is configured to monitor packets from the mobile device and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves (e.g., IP traffic and/or other network protocols of traffic, such as GTP-U traffic, between various monitored interfaces as similarly described above with respect to FIGS. 1A-1D) and to identify a user associated with the traffic flow (e.g., to identify a user-ID and an application-ID (APP-ID) as described herein). For example, APP ID 412 can recognize a GET request in the received data and conclude that the session requires an HTTP decoder 414. As another example, APP ID 412 can recognize GTP-U session messages carrying encapsulated IP traffic from UEs (e.g., over various interfaces, such as similarly described above with respect to FIGS. 1A-1D) and conclude that the session requires a GTP-U decoder (e.g., to extract information exchanged in the GTP-U traffic session over various interfaces including various parameters, such as similarly described above with respect to FIGS. 1A-1D and FIGS. 2A-2D). For each type of protocol, there exists a corresponding decoder 414. In one embodiment, the application identification is performed by an application identification module (e.g., APP ID component/engine), and a user identification is performed by another component/engine. Based on the determination made by APP ID 412, the packets are sent to an appropriate decoder 414. Decoder 414 is configured to assemble packets (e.g., which may be received out of order) into the correct order, perform tokenization, and extract out information (e.g., such to extract various information exchanged in GTP-U traffic over various interfaces as similarly described above and further described below). Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U/IP traffic and/or DPI of monitored GTP-U/IP and/or other protocol(s) traffic, such as SGi/N6/other interfaces as similarly described above with respect to FIGS. 1A-1D) is applied as described herein with respect to various embodiments based on the monitored, decrypted, identified, and decoded session traffic flows.

As also shown in FIG. 4, an interface (I/F) communicator 422 is also provided for security platform manager communications. In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, reference point interfaces such as SGi, N6, and/or other interfaces where wired and wireless network traffic flow exists). As such, network device 400 including OF communicator 422 can be used to implement the disclosed techniques for applying subscriber-ID based security, equipment-ID based security, and/or network slice-ID based security with user-ID and syslog messages in mobile networks as described above and as will be further described below.

Additional example processes for the disclosed techniques for applying subscriber-ID based security, equipment-ID based security, and/or network slice-ID based security with user-ID and syslog messages in mobile networks will now be described.

Figure 5:
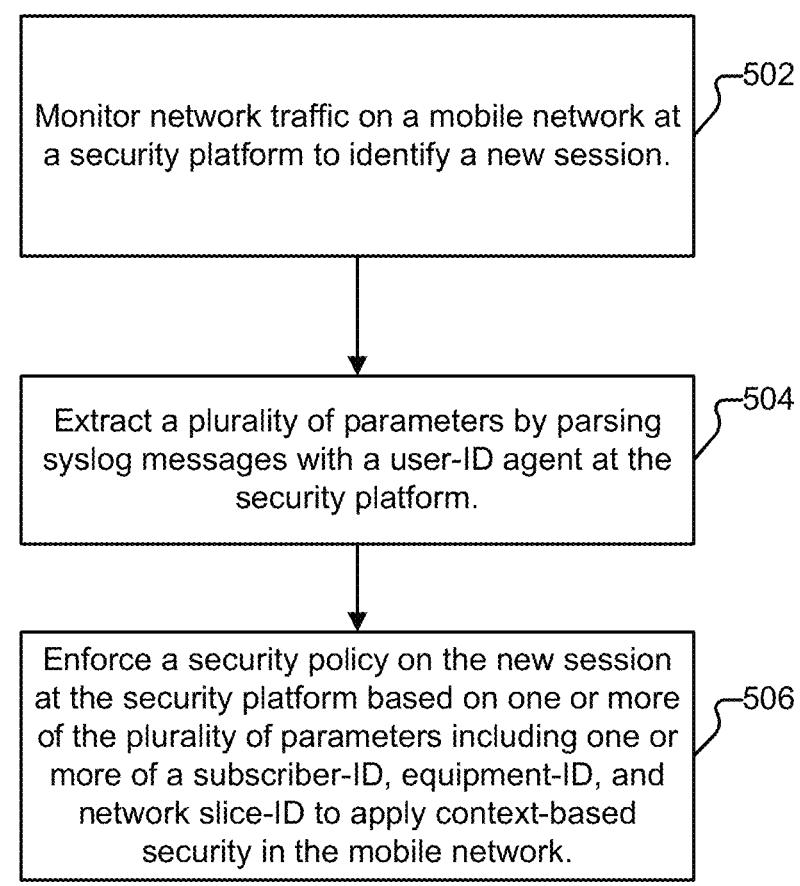
FIG. 5 is a flow diagram of a process for applying subscriber-ID based security, equipment-ID based security, and/or network slice-ID based security with user-ID and syslog messages in mobile networks in accordance with some embodiments.

Example Processes for Applying Subscriber-ID Based Security, Equipment-ID Based Security, and/or Network Slice-ID Based Security with User-ID and Syslog Messages in Mobile Networks FIG. 5 is a flow diagram of a process for applying subscriber-ID based security, equipment-ID based security, and/or network slice-ID based security with user-ID and syslog messages in mobile networks in accordance with some embodiments. In some embodiments, a process 500 as shown in FIG. 5 is performed by the security platform and techniques as similarly described above including the embodiments described above with respect to FIGS. 1A-4. In one embodiment, process 500 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 502, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over SGi, N6, and/or other interfaces) and/or other protocols, on the mobile network and, more specifically, by performing the disclosed techniques can monitor various interfaces, such as the SGi and N6 interfaces, as similarly described above with respect to FIGS. 1A-1D.

At 504, extracting a plurality of parameters by parsing syslog messages with a user-ID agent at the security platform is performed. For example, the parameters as similarly described above with respect to FIGS. 1A-1D and 2A-2D can be extracted.

At 506, enforcing a security policy on the new session at the security platform based on one or more of the plurality of parameters including one or more of a subscriber-ID, equipment-ID, and network slice-ID to apply context-based security in the mobile network is performed. For example, security policy enforcement can include allowing or blocking the session.

Figure 6:
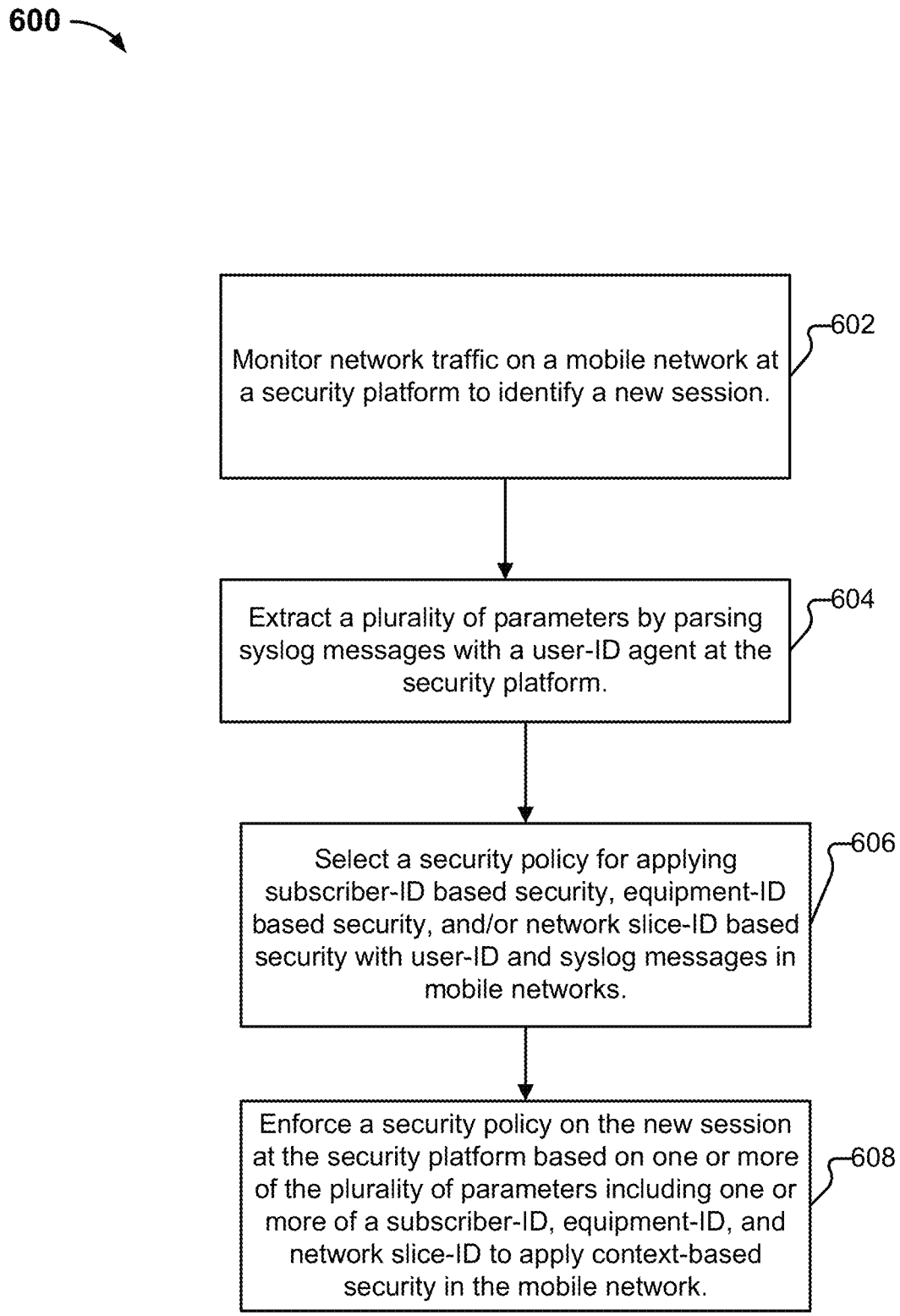
FIG. 6 is another flow diagram of a process for applying subscriber-ID based security, equipment-ID based security, and/or network slice-ID based security with user-ID and syslog messages in mobile networks in accordance with some embodiments.

FIG. 6 is another flow diagram of a process for applying subscriber-ID based security, equipment-ID based security, and/or network slice-ID based security with user-ID and syslog messages in mobile networks in accordance with some embodiments. In some embodiments, a process 600 as shown in FIG. 6 is performed by the security platform and techniques as similarly described above including the embodiments described above with respect to FIGS. 1A-4. In one embodiment, process 600 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over SGi, N6, and/or other interfaces) and/or other protocols, on the mobile network and, more specifically, by performing the disclosed techniques can monitor various interfaces, such as the SGi and N6 interfaces, as similarly described above with respect to FIGS. 1A-1D.

At 604, extracting a plurality of parameters by parsing syslog messages with a user-ID agent at the security platform is performed. For example, the parameters as similarly described above with respect to FIGS. 1A-1D and 2A-2D can be extracted.

At 606, selecting a security policy for applying subscriber-ID based security, equipment-ID based security, and/or network slice-ID based security with user-ID and syslog messages at the security platform is performed. For example, the parameters as similarly described above with respect to FIGS. 1A-1D and 2A-2D can be extracted.

At 608, enforcing a security policy on the new session at the security platform based on one or more of the plurality of parameters including one or more of a subscriber-ID, equipment-ID, and network slice-ID to apply context-based security in the mobile network is performed. For example, security policy enforcement can include allowing or blocking the session.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic on a mobile network at a security platform to identify a new session, comprising:
receive syslog messages at the security platform from one or more of the following: a 4G network entity or a 5G network entity;
extract a plurality of parameters by parsing the syslog messages with a user-ID agent at the security platform, comprising:
extract one or more parameters for performing one or more of the following: subscriber-ID based security, equipment-ID based security, or network slice-ID security; and
enforce a security policy on the new session at the security platform based on more than one parameter of the plurality of parameters to apply context-based security in the mobile network, wherein the more than one parameter includes subscriber-ID, equipment-ID, and network slice-ID, wherein the subscriber-ID includes one or more of the following: International Mobile Subscription Identity (IMSI), Subscription Permanent Identifier (SUPI), a network access identifier (NAI), a Global Line Identifier (GLI), or a Global Cable Identifier (GCI), wherein the equipment-ID includes the following: International Mobile Equipment Identifier (IMEI) and Permanent Equipment Identifier (PEI), and wherein the network slice-ID includes two or more of the following: a Single Network Slice Selection Assistance Information (S-NSSAI), a Slice/Service type (SST) field, or a Slice Differentiator (SD); and a memory coupled to the processor and configured to provide the processor with instructions.

2. The system recited in claim 1, wherein the context-based security includes subscriber-ID based security.

3. The system recited in claim 1, wherein the context-based security includes equipment-ID based security.

4. The system recited in claim 1, wherein the context-based security includes network slice-based security.

5. The system recited in claim 1,
wherein the mobile network is a private 4G network of a core mobile network.

6. The system recited in claim 1,
wherein the mobile network is a private 5G network of a core mobile network.

7. The system recited in claim 1, wherein the processor is further configured to:
perform threat level identification and prevention in the mobile network.

8. The system recited in claim 1, wherein the processor is further configured to:
perform application identification and control in the mobile network.

9. The system recited in claim 1, wherein the processor is further configured to:
perform URL filtering in the mobile network.

10. The system recited in claim 1, wherein the processor is further configured to:
block the new session from accessing a resource based on the security policy.

11. The system recited in claim 1, wherein the processor is further configured to:
allow the new session to access a resource based on the security policy.

12. A method, comprising:
monitoring network traffic on a mobile network at a security platform to identify a new session, comprising:
receiving syslog messages at the security platform from one or more of the following: a 4G network entity or a 5G network entity;
extracting a plurality of parameters by parsing the syslog messages with a user-ID agent at the security platform, comprising:
extracting one or more parameters for performing one or more of the following: subscriber-ID based security, equipment-ID based security, or network slice-ID security; and
enforcing a security policy on the new session at the security platform based on more than one parameter of the plurality of parameters to apply context-based security in the mobile network, wherein the more than one parameter includes subscriber-ID, equipment-ID, and network slice-ID, wherein the subscriber-ID includes two or one or more of the following: International Mobile Subscription Identity (IMSI), Subscription Permanent Identifier (SUPI), a network access identifier (NAI), a Global Line Identifier (GLI), or a Global Cable Identifier (GCI), wherein the equipment-ID includes the following: International Mobile Equipment Identifier (IMEI) and Permanent Equipment Identifier (PEI), and wherein the network slice-ID includes two or more of the following: a Single Network Slice Selection Assistance Information (S-NSSAI), a Slice/Service type (SST) field, or a Slice Differentiator (SD).

13. The method of claim 12, wherein the context-based security includes subscriber-ID based security.

14. The method of claim 12, wherein the context-based security includes equipment-ID based security.

15. The method of claim 12, wherein the context-based security includes network slice-ID based security.

16. The method of claim 12, further comprising:
blocking the new session from accessing a resource based on the security policy.

17. A computer program product, the computer program product being embodied in a non-transitory computer readable storage medium and comprising computer instructions for:
monitoring network traffic on a mobile network at a security platform to identify a new session, comprising:
receiving syslog messages at the security platform from one or more of the following: a 4G network entity or a 5G network entity;
extracting a plurality of parameters by parsing the syslog messages with a user-ID agent at the security platform, comprising:
extracting one or more parameters for performing one or more of the following: subscriber-ID based security, equipment-ID based security, or network slice-ID security; and
enforcing a security policy on the new session at the security platform based on more than one parameter of the plurality of parameters to apply context-based security in the mobile network, wherein the more than one parameter includes subscriber-ID, equipment-ID, and network slice-ID, wherein the subscriber-ID includes two or one or more of the following: International Mobile Subscription Identity (IMSI), Subscription Permanent Identifier (SUPI), a network access identifier (NAI), a Global Line Identifier (GLI), or a Global Cable Identifier (GCI), wherein the equipment-ID includes the following: International Mobile Equipment Identifier (IMEI) and Permanent Equipment Identifier (PEI), and wherein the network slice-ID includes two or more of the following: a Single Network Slice Selection Assistance Information (S-NSSAI), a Slice/Service type (SST) field, or a Slice Differentiator (SD).

* * * * *